United States Patent Office 2,971,945
Patented Feb. 14, 1961

2,971,945

POLYMERS OF ALLYL 3,4-EPOXY-2-HYDROXYALKANOATES

John R. Kilsheimer, South Charleston, W. Va., assignor to Union Carbide Corporation, a corporation of New York No Drawing. Filed Dec. 19, 1956, Ser. No. 629,228

16 Claims. (Cl. 260—78.3)

This invention relates to compositions comprising polymerized compounds. More particularly, the invention is directed to polymer compositions comprising as characteristic components thereof allyl 3,4-epoxy-2-hydroxyalkanoates.

One of the primary objects of this invention is to provide a novel series of resins that are cross-linkable at various stages of processing to yield three-dimensional structures possessing desirable physical characteristics. It is a recognized fact that cross-linkable resins which will, under conditions of use, yield a three-dimensional structure, have certain definite advantages in the plastics field. Low molecular weight resins are usually characterized by their ease of handling and ease of fabrication but low molecular weight resins usually possess low tensile strength. On the other hand, high molecular weight resins, and particularly the high molecular weight three-dimensional structures, possess high tensile strength but are relatively infusible, insoluble and difficult to fabricate. It would be extremely desirable, therefore, to have a resin which had a low molecular weight during fabrication and which could later be cross-linked into a high molecular weight resin at a later stage thus combining the best advantages of the high molecular weight and low molecular weight resins.

Heretofore, polyvinyl chloride and other vinyl resins, as they are known today, have many valuable properties which have caused their widespread use in many fields. There are, however, several fields in which the common vinyl resins are slightly used because their physical properties render them unsuitable. For example, most of the thermoplastic vinyl polymers are unacceptable for use in applications where lack of deformation at elevated temperatures is essential. A vinyl resin, on the other hand, which could be cross-linked after fabrication would then have "stiffness" versus "temperature characteristics" such that the useful temperature range of the product would be considerably higher than any of the widely used, easily processable, thermoplastic vinyl resins now commercially available.

Another physical characteristic of the thermoplastic vinyl resin which often plagues the formulator in the industry is the progressive deformation under sustained loading at moderate temperatures often known as "cold flow" or creep behavior. A cross-linked resin, on the other hand, will ordinarily have much less tendency toward cold flow than a two-dimensional thermoplastic vinyl polymer. It is, therefore, an object of the present invention to provide low molecular weight resins polymerized substantially linearly through the allyl group which are capable of cross-linking through the epoxy group to produce high molecular weight three-dimensional structures having in combination the advantageous properties of both the low molecular weight and high molecular weight resin.

The compositions of this invention comprise polymers of compounds characterized by the general formula:

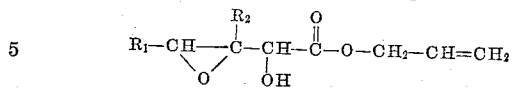

wherein $R_1$ and $R_2$ represent hydrogen and similar or dissimilar alkyl groups containing from 1 through 4 carbon atoms. These compounds are characterized by the presence therein of one epoxy grouping

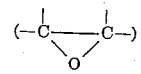

and one hydroxyl grouping (—OH) contained in the alkanoate portion of the molecule and one ethylenic grouping ($>C=CH_2$) in the allyl group. The presence of three functional groups in the one molecule makes them highly useful for the preparation of three-dimensional cross-linked resin structures. For example, in accordance with the practice of this invention, the allyl esters may be polymerized with each other or with other vinyl monomers through the ethylenic grouping to form soluble, fusible, linear polymers and later cured or cross-linked through the epoxide grouping to form insoluble, infusible, three-dimensional structures. The hydroxyl group, however, does not participate substantially in the initial polymer forming reaction. It does, however, have a definite function in that it enhances compatibility with certain types of polymers.

The polymerized compositions of this invention are directed to compositions comprising as characteristic components, allyl 3,4-epoxy-2-hydroxyalkanoates corresponding to the general formula:

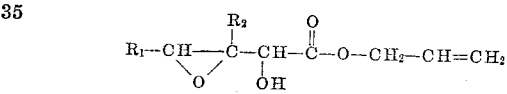

wherein $R_1$ and $R_2$ represent hydrogen and similar or dissimilar alkyl groups containing from 1 to 4 carbon atoms.

A more specific embodiment of the polymerized compositions of this invention is directed to the products of polymerization of (a) a polymerizable unsaturated monomer containing at least one polymerizable group, and (b) a compound represented by the formula:

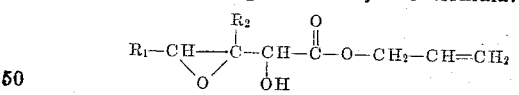

wherein $R_1$ and $R_2$ represent hydrogen and similar or dissimilar alkyl groups containing from 1to 4 carbon atoms.

A typical group of polymerizable unsaturated monomers polymerizable with the polymerizable epoxy monomers are the aromatic monomers containing ethylenically unsaturated side chains such as styrene, chlorostyrene, allyl styrene and the like.

A preferred modification of this embodiment of the invention is directed to compositions of matter comprising the product of polymerization of (a) a vinyl ester of an inorganic acid such as vinyl chloride, vinyl bromide, vinyl fluoride, acrylonitrile and methacrylonitrile, and (b) a compound represented by the formula:

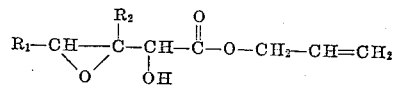

wherein $R_1$ and $R_2$ represent hydrogen and similar or dissimilar alkyl group containing from 1 to 4 carbon atoms.

Another modification of this embodiment of the invention is directed to compositions of matter comprising the product of polymerization of a mixture containing (a) a vinylidene halide such as vinylidene chloride, vinylidene bromide, vinylidene fluoride, and (b) a compound represented by the formula:

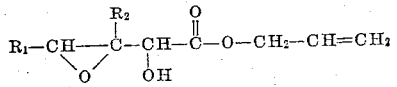

wherein $R_1$ and $R_2$ represent hydrogen and similar or dissimilar alkyl groups containing from 1 to 4 carbon atoms.

Still another modification of this embodiment of the invention is directed to compositions of matter comprising the product of polymerization of (a) a vinyl ester of an aliphatic monocarboxylic acid, and (b) a compound represented by the formula:

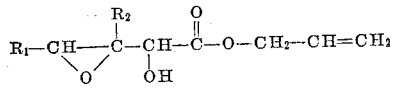

wherein $R_1$ and $R_2$ represent hydrogen and similar or dissimilar alkyl groups containing from 1 to 4 carbon atoms.

Typical vinyl esters of aliphatic monocarboxylic acids include vinyl acetate, vinyl butyrate, vinyl chloroacetate, vinyl formate and vinyl caproate.

Still another important modification of this embodiment of the invention is directed to compositions of matter comprising the product of polymerization of a mixture containing (a) an alkyl ester of an unsaturated aliphatic monocarboxylic acid such as methyl acrylate, methyl methacrylate and ethyl acrylate; the unsaturated aliphatic monocarboxylic acids such as acrylic acid and the alpha-alkyl substituted acrylic acids, and (b) a compound represented by the formula:

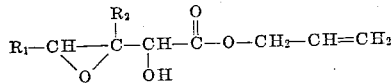

wherein $R_1$ and $R_2$ represent hydrogen and similar to dissimilar alkyl groups containing from 1 to 4 carbon atoms.

Still another particularly important modification of this modification of the invention is directed to compositions of matter comprising the product of polymerization of mixtures containing (a) an unsaturated aliphatic ester of a saturated aliphatic polybasic acid or an unsaturated aliphatic ester of an unsaturated aliphatic polybasic acid or unsaturated esters of dibasic aromatic acids such as, for example, the divinyl, diallyl and dimethallyl esters of oxalic, maleic, malonic, citric, and tartaric acids; the divinyl, diallyl and dimethallyl esters of phthalic, isophthalic, terephthalic and naphthalene dicarboxylic acids, and (b) a compound represented by the formula:

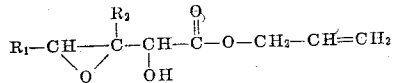

wherein $R_1$ and $R_2$ represent hydrogen and similar or dissimilar alkyl groups containing from 1 to 4 carbon atoms.

Still other important groups of polymerizable unsaturated monomers polymerizable with the allyl 3,4-epoxy-2-hydroxyalkanoates, are those monomers having a conjugated system of ethylenic double bonds, such, as for example, 1,3-butadiene, isoprene, 2,3-dimethyl-1,3-butadiene, 1-acetoxybutadiene, piperylene, 2-cyano-1,3-butadiene, 2-methoxy-1,3-butadiene and 2-fluoro-1,3-butadiene; monomers containing an acetylenic linkage, such as, for example, acetylene, alkyl acetylenes and dialkyl acetylenes as well as dimers and trimers containing one or more acetylenic linkages or mixed olefinic and acetylenic linkages; unsaturated aliphatic ethers of saturated polyhydric alcohols, such as the divinyl, diallyl and dimethallyl ethers of glycol, trimethylene glycol and similar derivatives of glycerol, manitol, sorbitol and the like; the unsaturated esters of polyhydric alcohols, such as the acrylic, methacrylic polyesters of glycol and organic olefinically unsaturated compounds containing one or more silicon atoms, such as vinyl triethoxy silane.

The allyl 3,4-epoxy-2-hydroxyalkanoates used as starting materials in preparing the novel polymers of this invention may be conveniently prepared by reacting an unsaturated aldehyde, such as acrolein, methacrolein, 2-ethyl-3-propyl acrolein, 2-methylcrotonaldehyde, 2-methyl-2-pentenal, 2-propyl-2-octenal, 2-ethylcrotonaldehyde and crotonaldehyde with hydrogen cyanide in the presence of a suitable catalyst to convert the aldehyde into the corresponding cyanohydrin which is then reacted with allyl alcohol in the presence of hydrogen chloride and a limited amount of water to form an ester according to the following equations:

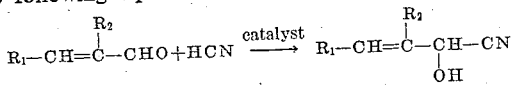

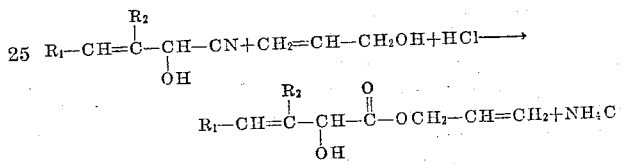

wherein $R_1$ and $R_2$ have the same meaning as hereinbefore defined.

Since only a limited amount of water is used, the ammonium chloride formed precipitates and can be readily separated by filtration. The filtrate is composed essentially of the crude ester which can be reacted directly with peracetic acid or refined by distillation and then reacted with peracetic acid. The allyl 2-hydroxyalkenoate, in turn, is subsequently reacted with peracetic in accordance with the following equation:

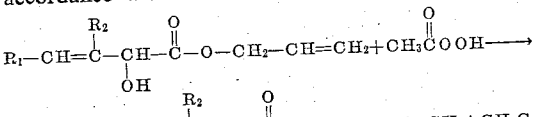

wherein $R_1$ and $R_2$ have the same meaning as hereinbefore defined.

The polymerization of the allyl 3,4-epoxy-2-hydroxyalkanoates, in accordance with the method of the invention, is initiated by heating the desired monomer or mixture of monomers in the presence of an inorganic or organic polymerization catalyst, such a potassium persulfate or acetyl peroxide. The polymerization may be carried out in solution, emulsion, suspension and bulk systems. If solvents are employed, they can be solvents for the monomers and polymer or they may be solvents for the monomers and nonsolvents for the polymers. Examples of solvents useful in a solution polymerization include acetone, tetrahydrofuran, dimethylformamide, benzene and the like.

In a typical solvent polymerization, a solvent such as acetone is charged to an autoclave and then the epoxy monomer and catalyst are added. The autoclave is then flushed out with nitrogen or other inert gas and sealed. When vinyl chloride is selected as the coreacting monomer, it is then passed into the autoclave. The reaction mixture is then brought up to temperature and the temperature is maintained until polymerization is substantially complete. Substantially complete polymerization of the reactive monomers can ordinarily be achieved in a period of time varying from about 16 to about 40 hours.

Generally, the solids content of the autoclave varnish containing the copolymerized resin can run as high as 40 percent solids. This provides an economic advantage in that less solvent is required to maintain a satisfactory viscosity.

If it is desired to carry out the polymerization reaction in an emulsion system, water, an emulsifier, and a water-soluble persulfate catalyst are charged to an autoclave. The reactive monomers are then charged to the autoclave. In the case of a vinyl chloride polymerization, the epoxy monomer is charged first, the system is then flushed out with an inert gas and then the vinyl chloride is added. Thereafter, the reaction mixture is brought to temperature and the temperature is maintained until polymerization is substantially complete. In a similar manner, the polymerization of the reactive monomers can be carried out in a suspension polymerization system.

The catalyst used in effecting the polymerization reaction can be either inorganic or organic in nature and may be exemplified by acetyl peroxide, benzoyl peroxide, benzoyl acetyl peroxide, tertiary-butyl hydroperoxide, tertiary-butyl perbenzoate, cumene hydroperoxide, tertiary-butyl peracetate, azo bisisobutyronitrile and the like. The amount of catalyst added can vary over a wide range. In general, the catalyst concentration will vary from 0.1 percent to 5.0 percent by weight of the material having polymerized.

The temperature employed in the polymerization may vary over a considerable range depending upon the monomer and catalyst being employed. In most cases, the temperature will vary from 0° C. to about 150° C. Preferred temperatures range from 40° C. to 60° C. Atmospheric, superatmospheric or subatmospheric pressures may be utilized. In practice, the polymerization is effected through the olefinic groups and later curing the resin to a three-dimensional structure can be effected through the epoxide groups with the aid of heat or various catalysts.

The unreacted materials are separated from the polymer by any suitable method, such as solvent extraction, precipitation, distillation, filtration and the like. The polymer resin can then be worked up in any suitable manner.

Other materials such as coloring agents, pigments, fillers and the like, may be incorporated into the resins as desired.

The polymer thus formed can be subsequently cured to a three-dimensional structure with the aid of heat and/or various catalysts.

A further embodiment of this invention is directed to composition blends comprising a glycidyl polyether of a polyhydric phenol and an epoxy polymer of a compound represented by the general formula:

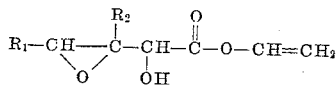

wherein $R_1$ and $R_2$ represent hydrogen and similar or dissimilar alkyl groups containing from 1 to 4 carbon atoms.

The glycidyl polyethers of polyhydric phenols are usually obtainable by reacting a polyhydric phenol with epichlorhydrin in a basic medium at a temperature of from about 50° C. to 150° C. The reaction is effected by heating for several hours and the product is then separated from the crude reaction mixture. The reaction product can be separated into components consisting of single simple compounds but what is ordinarily preferred is to blend a complex mixture of glycidyl polyethers with the epoxide polymers referred to above.

Any of the various polyhydric phenols are used in preparing the polyethers employed in preparing the compositions and include mononuclear phenols such as resorcinol, catechol, hydroquinone; polynuclear phenols such as 2,2-bis(4-hydroxyphenyl)propane, 4,4'-dihydroxybenzophenone, bis(4-hydroxyphenyl)methane, 1,1-bis(4-hydroxyphenyl)ethane, 1,1 - bis(4 - hydroxyphenyl)isobutane, 2,2-bis(4 - hydroxyphenyl)butane, 2,2-bis(4-hydroxy - 2 - methylphenyl)propane, 2,2-bis(4-hydroxy-2-tertiarybutylphenyl)propane, 2,2 - bis(2 - hydroxynaphthyl)pentane as well as the more complex polyhydric phenols.

The following examples describe typical processes for the preparation of the epoxy-containing polymer-forming monomers; processes of the invention involving the production of the polymers and copolymers of this invention and the use of specific copolymer formulations of different compositions in accordance with the invention.

As used herein the term "reduced viscosity" is used to indicate the molecular weight of the copolymers produced. The term "reduced viscosity" is that number obtained as the quotient when the specific kinematic viscosity of the resin is divided by the resin concentration in grams per deciliter of solvent. The specific kinematic viscosity is determined in accordance with the following equation:

Specific Kinematic Viscosity =
$$\frac{\text{Viscosity of 0.1 gram resin in 50 cc. of solvent}}{\text{Viscosity of solvent}} - 1$$

Reduced viscosity can also be determined by the following equation:

Reduced Viscosity =
$$\frac{\text{Viscosity of resin in solvent} - \text{viscosity of solvent}}{\text{viscosity of solvent} - \text{concentration of resin in solvent (grams/100 milliliters)}}$$

The advantages and utility of the method of the invention and of the products obtained thereby will become further apparent from the following detailed examples included to illustrate the best modes presently contemplated for carrying out the invention:

EXAMPLE 1

*Copolymer of allyl 3,4-epoxy-2-hydroxybutyrate-vinyl chloride by solvent polymerization*

To a Pyrex tube was charged:

1.0 gram allyl 3,4-epoxy-2-hydroxybutyrate
9.0 grams vinyl chloride
5.0 cc. acetone
1.0 cc. of a 25 percent solution of acetyl peroxide in dimethyl phthalate The tube was purged with nitrogen, sealed and rocked in a water bath at 50° C. for 22 hours. The recovered polymer amounted to 3.4 grams (34 percent conversion) and analyzed 91 percent polyvinyl chloride. The polymer had a reduced viscosity of 0.26 in cyclohexanone. A film was cast from a cyclohexanone solution of this resin containing one percent phosphoric acid (based on resin weight). The film was cured 20 minutes at 350° F. after which time it was 89 percent insoluble in cyclohexanone.

EXAMPLE 2

*Copolymer of allyl 3,4-epoxy-2-hydroxybutyrate-acrylonitrile*

To a Pyrex tube was charged:

5.0 grams allyl 3,4-epoxy-2-hydroxybutyrate
5.0 grams acrylonitrile
5.0 cc. acetone
1.0 cc. of a 25 percent solution of acetyl peroxide in dimethyl phthalate The tube was purged with nitrogen, sealed and rocked in a water bath at 50° C. for 3.75 hours. The recovered polymer amounted to 0.43 grams (4.3 percent conversion) and analyzed 74 percent polyacrylonitrile. The polymer had a reduced viscosity of 0.91 in dimethylformamide. A film was cast from a dimethylformamide solution of this resin containing one per cent phosphoric acid (based on resin weight). The film was cured 20 minutes at 350° F. after which time it was 98 percent insoluble in dimethylformamide.

EXAMPLE 3

*Copolymer of allyl 3,4-epoxy-2-hydroxybutyrate-vinylidene chloride by bulk polymerization*

To a Pyrex tube was charged:

7.0 grams allyl 3,4-epoxy-2-hydroxybutyrate
3.0 grams vinylidene chloride
1.0 cc. of a 25 percent solution of acetyl peroxide in dimethyl phthalate The tube was purged with nitrogen, sealed and rocked in a water bath at 50° C. for 53 hours. The recovered polymer amounted to 1.1 grams (11 percent conversion) and analyzed 66.2 percent polyvinylidene chloride. A film was cast from a cyclehexanone solution of this resin containing one percent phosphoric acid (based on resin weight). The film was cured 20 minutes at 350° F. after which time it was 67 percent insoluble in cyclohexanone.

EXAMPLE 4

*Homopolymer of allyl 3,4-epoxy-2-hydroxybutyrate by bulk polymerization*

To a Pyrex tube was charged:

5.0 grams allyl 3,4-epoxy-2-hydroxybutyrate
2.0 cc. of a 25 percent solution of acetyl peroxide in dimethyl phthalate The tube was purged with nitrogen, sealed and rocked in a water bath at 50° C. for 193 hours plus an additional 12 hours at 150° C. in an electrically heated aluminum block. The recovered polymer amounted to 2.5 grams (50 percent conversion) and analyzed 53.9 percent carbon and 6.6 percent hydrogen. The theoretical amount of carbon in polyallyl 3,4-epoxy-2-hydroxybutyrate is 53.2 percent while hydrogen is 6.3 percent. A film was cast from a cyclohexanone solution of this resin containing one percent phosphoric acid (based on resin weight). The film was cured 20 minutes at 350° F. after which it was 28 percent insoluble in cyclohexanone.

EXAMPLE 5

*Copolymer of allyl 3,4-epoxy-2-hydroxybutyrate chlorostyrene*

To a Pyrex tube was charged:

8.5 grams allyl 3,4-epoxy-2-hydroxybutyrate
1.5 grams chlorostyrene
0.2 gram azo isobutyric dinitrile The tube was purged with nitrogen, sealed and rocked in a water bath at 50° C. for 21.5 hours. The recovered polymer amounted to 1.1 grams (11 percent conversion) and analyzed 79 percent polychlorostyrene. A film was cast from a benzene solution of this resin containing one percent phosphoric acid (based on resin weight). The film was cured 20 minutes at 350° F. after which it was 16 percent insoluble in benzene.

EXAMPLE 6

*Copolymer of allyl 3,4-epoxy-2-hydroxybutyrate-ethyl acrylate*

To a Pyrex tube was charged:

5.0 grams allyl 3,4-epoxy-2-hydroxybutyrate
5.0 grams ethyl acrylate
1.0 cc. of a 25 percent solution of acetyl peroxide in dimethyl phthalate The tube was purged with nitrogen, sealed and rocked in a water bath at 50° C. for 43 hours. The recovered polymer amounted to 0.5 gram (5 percent conversion) and analyzed 58.8 percent carbon which is equivalent to 82 percent polyethyl acrylate.

EXAMPLE 7

*Copolymer of allyl 3,4-epoxy-2-hydrobutyrate-vinyl chloride made by an emulsion polymerization procedure*

To a Pyrex tube was charged:

7.0 grams vinyl chloride
3.0 grams allyl 3,4-epoxy-2-hydroxybutyrate
0.1 gram potassium persulfate
30.0 cc. distilled water
4.0 cc. of a five percent aqueous solution of dioctyl ester of sodium sulfosuccinic acid The tube was purged with nitrogen, sealed and rocked in a water bath at 50° C. for 64 hours. The recovered polymer amounted to 1.4 grams (14 percent conversion) and analyzed 87 percent polyvinyl chloride. The polymer had a reduced viscosity of 0.78 in cyclohexanone. A film was cast from a cyclohexanone solution of this resin containing 3 percent diethylenetriamine (based on resin weight). The film was cured 20 minutes at 350° F. after which time it was 76 percent insoluble in cyclohexanone. A film cast and cured in a similar manner but containing one percent phosphoric acid in place of the amine was 74 percent insoluble.

EXAMPLE 8

*Homopolymer of allyl 3,4-epoxy-2-hydroxyvalerate*

To a Pyrex tube was charged:

10.0 grams allyl 3,4-epoxy-2-hydroxyvalerate
2.0 cc. of a 25 percent solution of acetyl peroxide in dimethyl phthalate The tube was purged with nitrogen, sealed and rocked in a water bath at 50° C. for 168 hours after which the tube was opened and 2 cc. additional of a 25 percent solution of acetyl peroxide in dimethyl phthalate was added. The tube was resealed and placed again in the water bath at 50° C. for 23 hours. The tube was then heated at 150° C. for 5 additional hours. The recovered polymer amounted to one gram (10 percent conversion) and analyzed 57 percent carbon and 7.0 percent hydrogen. The theoretical analysis is carbon 56.2 percent and hydrogen 6.4 percent. A film was cast from a cyclohexanone solution of this resin containing 5 percent diethylenetriamine (based on resin weight). The film was cured 20 minutes at 350° F. after which it was 53 percent insoluble in cyclohexanone.

EXAMPLE 9

*Copolymer of allyl 3,4-epoxy-2-hydroxyvalerate-acrylonitrile by solvent polymerization procedure*

To a Pyrex tube was charged:

7.0 grams allyl 3,4-epoxy-2-hydroxyvalerate
3.0 grams acrylonitrile
5.0 cc. acetone
1.0 cc. of a 25 percent solution of acetyl peroxide in dimethyl phthalate The tube was purged with nitrogen, sealed and rocked in a water bath at 50° C. for 17 hours. The recovered polymer amounted to 2.4 grams (24 percent conversion) and analyzed 57 percent polyacrylonitrile. The polymer had a reduced viscosity of 0.90 in dimethylformamide. A film was cast from a dimethylformamide solution of this resin containing one percent phosphoric acid (based on resin weight). The film was cured 20 minutes at 350° F. after which it was 88 percent insoluble in dimethylformamide.

EXAMPLE 10

*Copolymer of allyl 3,4-epoxy-2-hydroxyvalerate-vinyl chloride by bulk polymerization procedure*

To a Pyrex tube was charged:

2.0 grams allyl 3,4-epoxy-2-hydroxyvalerate
8.0 grams vinyl chloride 1.0 cc. of a 25 percent solution of acetyl peroxide in dimethyl phthalate The tube was purged with nitrogen, sealed and rocked in a water bath at 50° C. for 17 hours. The recovered polymer amounted to 5.1 grams (51 percent conversion) and analyzed 83 percent polyvinyl chloride. The polymer had a reduced viscosity of 0.32 in cyclohexanone. A film was cast from a cyclohexanone solution of this resin containing 3 percent diethylenetriamine (based on resin weight). The film was cured 20 minutes at 350° F. after which it was 47 percent insoluble in cyclohexanone. A film cast and cured in a similar manner but containing one percent phosphoric acid in place of the amine was 63 percent insoluble.

EXAMPLE 11

*Copolymer of allyl 3,4-epoxy-2-hydroxyvalerate-vinyl acetate*

To a Pyrex tube was charged:

3.0 grams allyl 3,4-epoxy-2-hydroxyvalerate
7.0 grams vinyl acetate
1.0 cc. of a 25 percent solution of acetyl peroxide in dimethyl phthalate The tube was purged with nitrogen, sealed and rocked in a water bath at 50° C. for 44 hours. The recovered polymer amounted to 3.5 grams (35 percent conversion). A film was cast from a benzene solution of the resin containing one percent phosphoric acid (based on resin weight). The film was cured 20 minutes at 350° F. after which it was 74 percent insoluble in benzene.

EXAMPLE 12

*Copolymer of allyl 3,4-epoxy-2-hydroxyvalerate chlorostyrene*

To a Pyrex tube was charged:

8.0 grams allyl 3,4-epoxy-2-hydroxyvalerate
2.0 grams chlorostyrene
2.0 cc. of a 25 percent solution of acetyl peroxide in dimethyl phthalate The tube was purged with nitrogen, sealed and rocked in a water bath at 50° C. for 44 hours. The recovered polymer amounted to 1.7 grams (17 percent conversion) and analyzed 93 percent polychlorostyrene. The polymer reduced viscosity was 0.11 in benzene. A film was cast from a benzene solution of this resin containing one percent phosphoric acid (based on resin weight). The film was cured 20 minutes at 350° F. after which it was 39 percent insoluble in benzene.

EXAMPLE 13

*Copolymer of allyl 3,4-epoxy-2-hydroxyvalerate-methyl methacrylate*

To a Pyrex tube was charged:

7.5 grams allyl 3,4-epoxy-2-hydroxyvalerate
2.5 grams methyl methacrylate
1.0 cc. of a 25 percent solution of acetyl peroxide in dimethyl phthalate.

The tube was purged with nitrogen, sealed and rocked in a water bath at 50° C. for 17 hours. The recovered polymer amounted to 2.1 grams (21 percent conversion) and analyzed 58.0 percent carbon which corresponds to 47 percent polymethyl methacrylate. The polymer had a reduced viscosity of 0.14 in benzene. A film was cast from a benzene solution of this resin containing one percent phosphoric acid (based on resin weight). The film was cured 20 minutes at 350° F. after which it was 65 percent insoluble in benzene.

EXAMPLE 14

*Copolymer of allyl 3,4-epoxy-2-hydroxyvalerate-ethyl acrylate*

To a Pyrex tube was charged:

5.0 grams allyl 3,4-epoxy-2-hydroxy valerate
5.0 grams ethyl acrylate
1.0 cc. of a 25 percent solution of acetyl peroxide in dimethyl phthalate.

The tube was purged with nitrogen, sealed and rocked in a water bath at 50° C. for 44 hours. The recovered polymer amounted to 1.2 grams (12 percent conversion) and analyzed 58.8 percent carbon which corresponds to 68 percent polyethyl acrylate. The polymer had a reduced viscosity of 0.29 in benzene. A film was cast from a benzene solution of this resin containing one percent phosphoric acid (based on resin weight). The film was cured 20 minutes at 350° F. after which it was 87 percent insoluble in benzene.

EXAMPLE 15

*Copolymer of allyl 3,4-epoxy-2-hydroxyvalerate-vinylidene chloride*

To a Pyrex tube was charged:

5.0 grams allyl 3,4-epoxy-2-hydroxyvalerate
5.0 grams vinylidene chloride
1.0 cc. of a 25 percent solution of acetyl peroxide in dimethyl phthalate.

The tube was purged with nitrogen, sealed and rocked in a water bath at 50° C. for 17 hours. The recovered polymer amounted to 3.4 grams (34 percent conversion) and analyzed 84 percent polyvinylidene chloride. The polymer had a reduced viscosity of 0.16 in cyclohexanone. A film was cast from a cyclohexanone solution of this resin containing one percent phosphoric acid (based on resin weight). The film was cured 20 minutes at 350° F. after which it was 24 percent insoluble in cyclohexanone. A film prepared in a similar manner, but with 3 percent diethylenetriamine replacing the phosphoric acid, was 72 percent insoluble in cyclohexanone after the 20 minute curing reaction.

EXAMPLE 16

*Copolymer of allyl 3,4-epoxy-2-hydroxyvalerate-vinyl chloride by an emulsion polymerization procedure*

To a pressure bottle was charged:

21.0 grams allyl 3,4-epoxy-2-hydroxyvalerate
9.0 grams vinyl chloride
0.3 gram potassium persulfate
150.0 cc. distilled water
10.0 cc. of a 5 percent aqueous solution of the dioctyl ester of sodium sulfosuccinic acid solution.

The bottle was purged with nitrogen, capped and rotated end-over-end in a water bath at 45° C. for 90 hours. The recovered polymer amounted to 1.1 grams (3.6 percent conversion) and analyzed 67 percent polyvinyl chloride. The polymer had a reduced viscosity of 0.36 in cyclohexanone. A film was cast from a cyclohexanone solution of this resin containing 3 percent diethylenetriamine (based on resin weight). The film was cured 20 minutes at 350° F. after which it was 72 percent insoluble in cyclohexanone.

EXAMPLE 17

*Interpolymer of allyl 3,4-epoxy-2-hydroxyvalerate-vinyl chloride-acrylonitrile*

To a Pyrex tube was charged:

6.0 grams vinyl chloride
2.0 grams acrylonitrile
2.0 grams allyl 3,4-epoxy-2-hydroxyvalerate
5.0 cc. acetone
1.0 cc. of a 25 percent solution of acetyl peroxide in dimethyl phthalate.

The tube was purged with nitrogen, sealed and rocked in a water bath at 50° C. for 4.5 hours. The recovered polymer amounted to 0.6 grams (6 percent conversion) and analyzed 34 percent polyvinyl chloride, 60 percent polyacrylonitrile and thus 6 percent allyl 3,4-epoxy-2-hydroxyvalerate (by weight difference). The film was cast from a cyclohexanone solution of this resin containing 3 percent diethylenetriamine (based on resin weight). The film was cured 20 minutes at 350° F. after which it was 61 percent insoluble in cyclohexanone.

EXAMPLE 18

*Interpolymer of allyl 3,4-epoxy-2-hydroxyvalerate-vinyl chloride-vinyl acetate*

To a Pyrex tube was charged:

6.0 grams vinyl chloride
2.0 grams vinyl acetate
2.0 grams allyl 3,4-epoxy-2-hydroxyvalerate
5.0 cc. acetone
1.0 cc. of a 25 percent solution of acetyl peroxide in dimethyl phthalate.

The tube was purged with nitrogen, sealed and rocked in a water bath at 50° C. for 13.5 hours. The recovered polymer amounted to 3.6 grams (36 percent conversion) and analyzed 72.4 percent polyvinyl chloride. The polymer had a reduced viscosity of 0.26 in cyclohexanone. A film was cast from a cyclohexanone solution of this resin containing 3 percent diethylenetriamine (based on resin weight). The film was cured 20 minutes at 350° F. after which it was 99 percent insoluble in cyclohexanone. A film cast and cured in a similar manner but containing one percent phosphoric acid in place of the amine was 62 percent insoluble.

EXAMPLE 19

*Interpolymer of allyl 3,4-epoxy-2-hydroxyvalerate-vinyl chloride-vinylidene chloride*

To a Pyrex tube was charged:

6.0 grams vinyl chloride
2.0 grams vinylidene chloride
2.0 grams allyl 3,4-epoxy-2-hydroxyvalerate
5.0 cc. acetone
1.0 cc. of a 25 percent solution of acetyl peroxide in dimethyl phthalate.

The tube was purged with nitrogen, sealed and rocked in a water bath at 50° C. for 13.5 hours. The recovered polymer amounted to 3.9 grams (39 percent conversion) and analyzed 48.2 percent chloride and 5.1 percent oxygen. This corresponds to 17 percent epoxyvalerate. The polymer had a reduced viscosity of 0.17 in cyclohexanone. A film was cast from a cyclohexanone solution of this resin containing 3 percent diethylenetriamine (based on resin weight). The film was cured 20 minutes at 350° F. after which it was 98 percent insoluble in cyclohexanone. A film cast and cured in a similar manner but containing one percent phosphoric acid in place of the amine was 62 percent insoluble.

EXAMPLE 20

*Copolymer of allyl 3,4-epoxy-2-hydroxyvalerate-vinyl chloride by bulk polymerization procedure*

To a Pyrex tube was charged:

9.0 grams allyl 3,4-epoxy-2-hydroxyvalerate
1.0 gram vinyl chloride
3.0 cc. of a 25 percent solution of acetyl peroxide in dimethyl phthalate.

The tube was purged with nitrogen, sealed and rocked in a water bath at 50° C. for 168 hours after which the tube was opened and 2 cc. additional of a 25 percent solution of acetyl peroxide in dimethyl phthalate was added. The tube was resealed and placed again in the water bath at 50° C. for 23 hours. The tube was then heated at 150° C. for 5 additional hours. The recovered polymer amounted to 2.0 grams (20 percent conversion) and analyzed 10 percent polyvinyl chloride. A film was cast from a cyclohexanone solution of this resin containing 3 percent diethylenetriamine (based on resin weight). The film was cured 20 minutes at 350° F. after which it was 70 percent insoluble in cyclohexanone.

EXAMPLE 21

*Copolymer of allyl 3,4-epoxy-2-hydroxyvalerate-vinyl chloride by suspension polymerization procedure*

To a pressure bottle was charged:

21.0 grams vinyl chloride
9.0 grams allyl 3,4-epoxy-2-hydroxyvalerate
1.0 gram lauroyl peroxide
150.0 cc. distilled water
15.0 cc. of a 9 percent aqueous solution of Cellosize WSLX*

* Cellosize WSLX is a grade of hydroxyethyl cellulose.

The bottle was purged with nitrogen, capped and roated end-over-end in a water bath at 45° C. for 40 hours. The recovered polymer amounted to 7.6 grams (25 percent conversion) and analyzed 73 percent polyvinyl chloride. The polymer had a reduced viscosity of 0.28 in cyclohexanone. A film was cast from a cyclohexanone solution of this resin containing 3 percent diethylenetriamine (based on resin weight). The film was cured 20 minutes at 350° F. after which it was 100 percent insoluble in cyclohexanone. A film cast and cured in a similar manner but containing one percent phosphoric acid in place of the amine was 40 percent insoluble.

EXAMPLE 22

*Interpolymer of allyl 3,4-epoxy-2-hydroxyvalerate-vinyl chloride-acrylonitrile*

To a Pyrex tube was charged:

6.0 grams vinyl chloride
2.0 grams acrylonitrile
2.0 grams allyl 3,4-epoxy-2-hydroxyvalerate
5.0 cc. acetone
1.0 cc. of a 25 percent solution of acetyl peroxide in dimethyl phthalate.

The tube was purged with nitrogen, sealed and rocked in a water bath at 50° C. for 7 hours. The recovered polymer amounted to 1.5 grams (15 percent conversion), and analyzed 33 percent polyvinyl chloride, 53 percent polyacrylonitrile, and thus 14 percent of the epoxy-hydroxyvalerate compound (by weight difference). The polymer had a reduced viscosity of 0.71 in dimethylformamide. A film was cast from a dimethylformamide solution of this resin containing one percent phosphoric acid (based on resin weight). The film was cured 20 minutes at 350° F. after which time it was 68 percent insoluble in dimethylformamide.

What is claimed is:

1. A copolymer of an epoxide monomer having the formula:

$$R_1-CH-\underset{\underset{O}{\diagdown\diagup}}{C}-CH-\underset{\underset{OH}{|}}{\overset{\overset{R_2}{|}}{C}}-\overset{\overset{O}{\|}}{C}-O-CH_2-CH=CH_2$$

wherein $R_1$ and $R_2$ represents at least one member selected from the group consisting of hydrogen and lower alkyl groups containing from 1 to 4 carbon atoms; and a polymerizable compound selected from the group consisting of vinyl chloride, acrylonitrile, vinyl acetate, vinylidene chloride, methyl acrylate, ethyl acrylate and chlorostyrene; said epoxide polymerized through the olefinic group.

2. A copolymer of vinyl chloride and the epoxide monomer, allyl 3,4-epoxy-2-hydroxybutyrate, said epoxide polymerized through the olefinic group.

3. A copolymer of acrylonitrile and the epoxide monomer, allyl 3,4-epoxy-2-hydroxybutyrate, said epoxide polymerized through the olefinic group.

4. A copolymer of vinylidene chloride and the epoxide monomer, allyl 3,4-epoxy-2-hydroxybutyrate, said epoxide polymerized through the olefinic group.

5. A copolymer of chlorostyrene and the epoxide monomer, allyl 3,4-epoxy-2-hydroxybutyrate, said epoxide polymerized through the olefinic group.

6. A copolymer of ethyl acrylate and the epoxide monomer, allyl 3,4-epoxy-2-hydroxybutyrate, said epoxide polymerized through the olefinic group.

7. A copolymer of vinyl chloride and the epoxide monomer, allyl 3,4-epoxy-2-hydroxyvalerate, said epoxide polymerized through the olefinic group.

8. A copolymer of acrylonitrile and the epoxide monomer, allyl 3,4-epoxy-2-hydroxyvalerate, said epoxide polymerized through the olefinic group.

9. A copolymer of vinyl acetate and the epoxide monomer, allyl 3,4-epoxy-2-hydroxyvalerate, said epoxide polymerized through the olefinic group.

10. A copolymer of chlorostyrene and the epoxide monomer, allyl 3,4-epoxy-2-hydroxyvalerate, said epoxide polymerized through the olefinic group.

11. A copolymer of methyl methacylate and the epoxide monomer, allyl 3,4-epoxy-2-hydroxyvalerate, said epoxide polymerized through the olefinic group.

12. A copolymer of ethyl acrylate and the epoxide monomer, allyl 3,4-epoxy-2-hydroxyvalerate, said epoxide polymerized through the olefinic group.

13. A copolymer of vinylidene chloride and the epoxide monomer, allyl 3,4-epoxy-2-hydroxyvalerate, said epoxide polymerizel through the olefinic group.

14. A copolymer of vinyl chloride, acrylonitrile and the epoxide monomer, allyl 3,4-epoxy-2-hydroxyvalerate, said epoxide polymerized through the olefinic group.

15. A copolymer of vinyl chloride, vinyl acetate and the epoxide monomer, allyl 3,4-epoxy-2-hydroxyvalerate, said epoxide polymerized through the olefinic group.

16. A copolymer of vinyl chloride, vinylidene chloride and the epoxide monomer, allyl 3,4-epoxy-2-hydroxyvalerate, said epoxide polymerized through the olefinic group.

References Cited in the file of this patent

UNITED STATES PATENTS

| | | |
|---|---|---|
| 2,680,109 | Stevens | June 1, 1954 |
| 2,786,068 | Frostick et al. | Mar. 19, 1957 |